United States Patent
Flynn (12)

(10) Patent No.: US 6,175,457 B1
(45) Date of Patent: Jan. 16, 2001

(54) DUAL POLARITY THERMAL ASPERITY DETECTOR FOR DIRECT ACCESS STORAGE DEVICE (DASD)

(75) Inventor: David Timothy Flynn, Rochester, MN (US)

(73) Assignee: International Business Machines Corporation, Armonk, NY (US)

(*) Notice: Under 35 U.S.C. 154(b), the term of this patent shall be extended for 0 days.

(21) Appl. No.: 09/167,236

(22) Filed: Oct. 6, 1998

(51) Int. Cl.[7] ................................. G11B 5/09; G11B 5/02
(52) U.S. Cl. ..................................... 360/46; 360/25
(58) Field of Search ........................... 360/25, 46

(56) References Cited

U.S. PATENT DOCUMENTS

| 4,786,890 | 11/1988 | Marcus et al. . |
| 5,196,849 | 3/1993 | Galbraith . |
| 5,233,482 | 8/1993 | Galbraith et al. . |
| 6,018,428 | * 1/2000 | Okamura ................................. 360/25 |
| 6,038,091 | * 3/2000 | Reed et al. .............................. 360/25 |

FOREIGN PATENT DOCUMENTS 9-231505 * 9/1997 (JP) .

* cited by examiner

*Primary Examiner*—W. Chris Kim
(74) *Attorney, Agent, or Firm*—Joan Pennington

(57) ABSTRACT

A method and apparatus are provided for dual polarity thermal asperity detection in a direct access storage device. A level threshold comparator receives a data signal from a data channel in the direct access storage device and compares sequential data samples of the data signal with a positive level threshold and a negative level threshold. Responsive to each identified consecutive data sample above the positive level threshold and responsive to each identified consecutive data sample less than the negative level threshold, a counter value is incremented. A count comparator compares the counter value with a predefined count threshold and identifies a thermal asperity event responsive to a counter value above the predefined count threshold.

17 Claims, 5 Drawing Sheets

DUAL POLARITY THERMAL ASPERITY DETECTOR FOR DIRECT ACCESS STORAGE DEVICE (DASD)

FIELD OF THE INVENTION

The present invention relates to methods and apparatus for detecting data, and more particularly to, a method and apparatus for dual polarity thermal asperity detection in a direct access storage device.

DESCRIPTION OF THE RELATED ART

Direct access storage devices (DASDs) often incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. Typically servo information is provided on one or more disk surfaces for reading by the transducer heads for accurately and reliably positioning transducer heads on the disk surfaces to read and write data.

A partial-response maximum-likelihood (PRML) detection channel advantageously is used to achieve high data density in writing and reading digital data on the disks. U.S. Pat. No. 4,786,890 discloses a class-IV PRML channel using a run-length limited (RLL) code. The disclosed class-IV partial response channel polynomial equals $(1-D^2)$, where D is a one-bit interval delay operator and $D^2$ is a two-bit interval delay operator and the channel response output waveform is described by taking the input waveform and subtracting from it the same waveform delayed by a two-bit interval. A (0,k=3/k1=5) PRML modulation code is utilized to encode 8 bit binary data into codewords comprised of 9 bit code sequences, where the maximum number k of consecutive zeroes allowed within a code sequence is 3 and the maximum number k1 of consecutive zeroes in the all-even or all-odd sequences is 5. Various improvements have been implemented in PRML detection channels in disk drives.

For example, U.S. Pat. No. 5,196,849 issued Mar. 23, 1993 to Richard L. Galbraith and assigned to the present assignee, discloses apparatus and a method for encoding a predefined number of bits of binary data into codewords having a predefined number of bits for PRML data channels. Rate 8/9 block codes having maximum ones and run length constraints $(0,8,12,\infty)$ and $(0,8,6,\infty)$ are disclosed for providing timing and gain control and reduced susceptibility to misequalization effects in PRML detection channels.

U.S. Pat. No. 5,233,482 to Richard L. Galbraith, Gregory J. Kerwin and Joe M. Poss, issued Aug. 3, 1995 to the present assignee, discloses thermal asperity compensation methods and apparatus for data detection in a PRML data channel.

In hard disk drives, a thermal asperity (TA) detector identifies readback signal anomalies, for example that result from the heating of the read element's magnetoresistive stripe as it strikes a disk defect.

An important aspect of the detector design is how to identify events of either positive or negative polarity without having two separate detectors and therefore doubling the hardware. Detectors which utilize an initial saturation level to dynamically switch the polarity of the level threshold can make incorrect decisions as the result of noise or signal shaping from equalization. The response of discrete time equalization can in fact cause the first sample of the TA event to be opposite in sign of the actual TA. This initial sample can cause the detector to commit to the wrong polarity with no chance of correcting in time to qualify the event.

SUMMARY OF THE INVENTION

A principal object of the present invention is to provide a method and apparatus for dual polarity thermal asperity detection in a direct access storage device. Other important objects of the present invention are to provide such method and apparatus substantially without negative effects; and to provide such method and apparatus that overcome some of the disadvantages of prior art arrangements.

In brief, a method and apparatus are provided for dual polarity thermal asperity detection in a direct access storage device. A level threshold comparator receives a data signal from a data channel in the direct access storage device and compares data samples of the data signal with a positive level threshold and a negative level threshold. Responsive to each identified consecutive data sample above the positive level threshold and responsive to each identified consecutive data sample less than the negative level threshold, a counter value is incremented. A count comparator compares the counter value with a predefined count threshold and identifies a thermal asperity event responsive to a counter value above the predefined count threshold.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
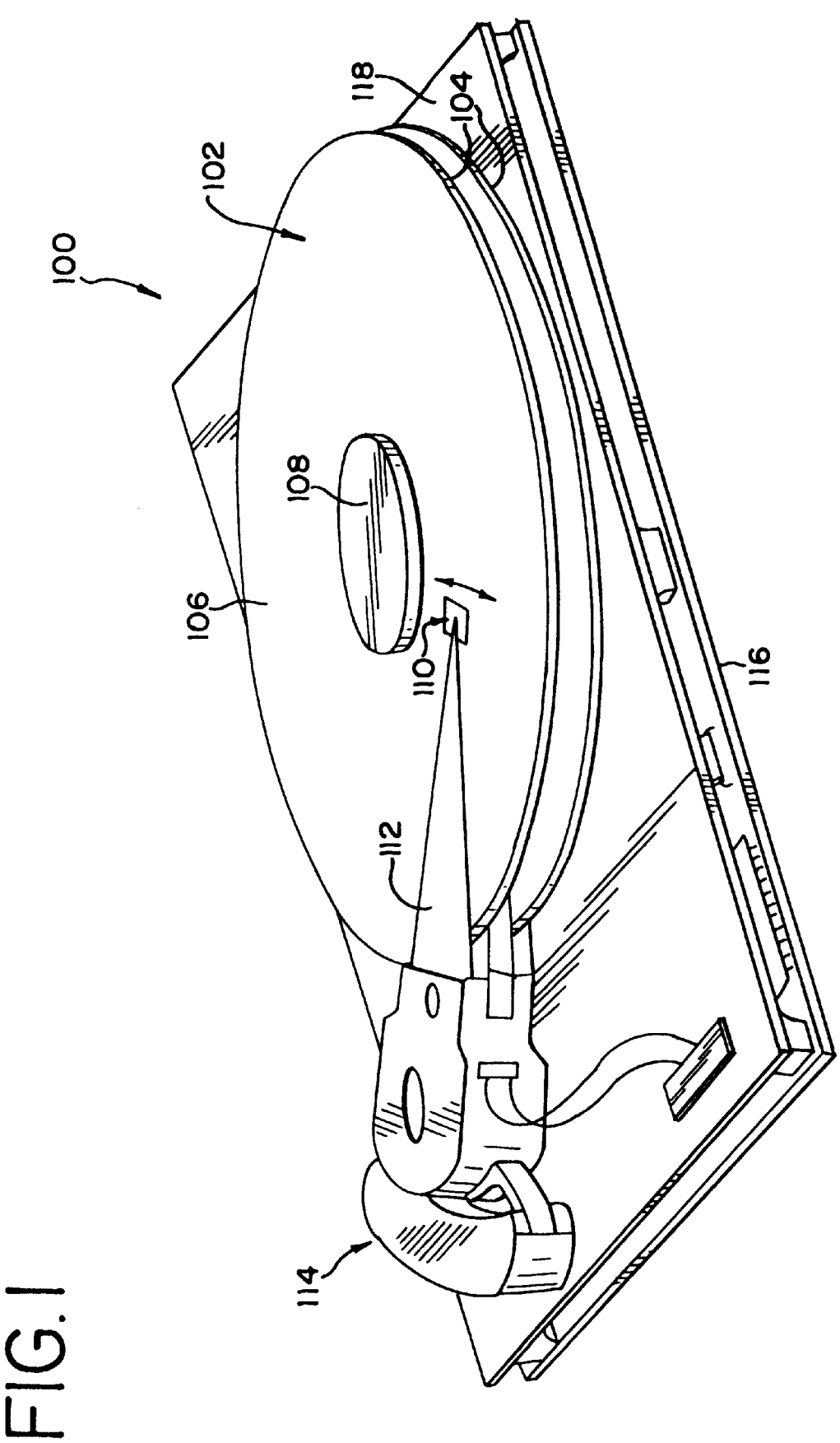
FIG. 1 is a diagrammatic view of a direct access storage device (DASD) embodying the present invention.

Having reference now to the drawings, in FIG. 1 there is illustrated a direct access data storage device (DASD) generally designated as 100 including a stack 102 of disks 104 each having at least one magnetic surface 106. The disks 104 are mounted parallel to one another for simultaneous rotation on and by an integrated spindle and motor assembly 108. Information on each magnetic disk surface 106 is read from or written to the disk surface 106 by a corresponding transducer head assembly 110 movable in a path having a radial component across the rotating disk surface 106.

Each transducer head assembly 110 is carried by an arm 112. The arms 112 are ganged together for simultaneous pivotal movement by a voice coil motor (VCM) magnet assembly 114. Drive signals applied to the VCM magnet assembly 114 cause the arms 112 to move in unison to position the transducer head assemblies 110 in registration with information storage tracks on the disk surfaces 106 where information is written or read. As shown in FIG. 1, an electronics card 116 is mounted together with a base support 118 of DASD 100. The utility of the present invention is not restricted to the details of a particular DASD construction.

Figure 2:
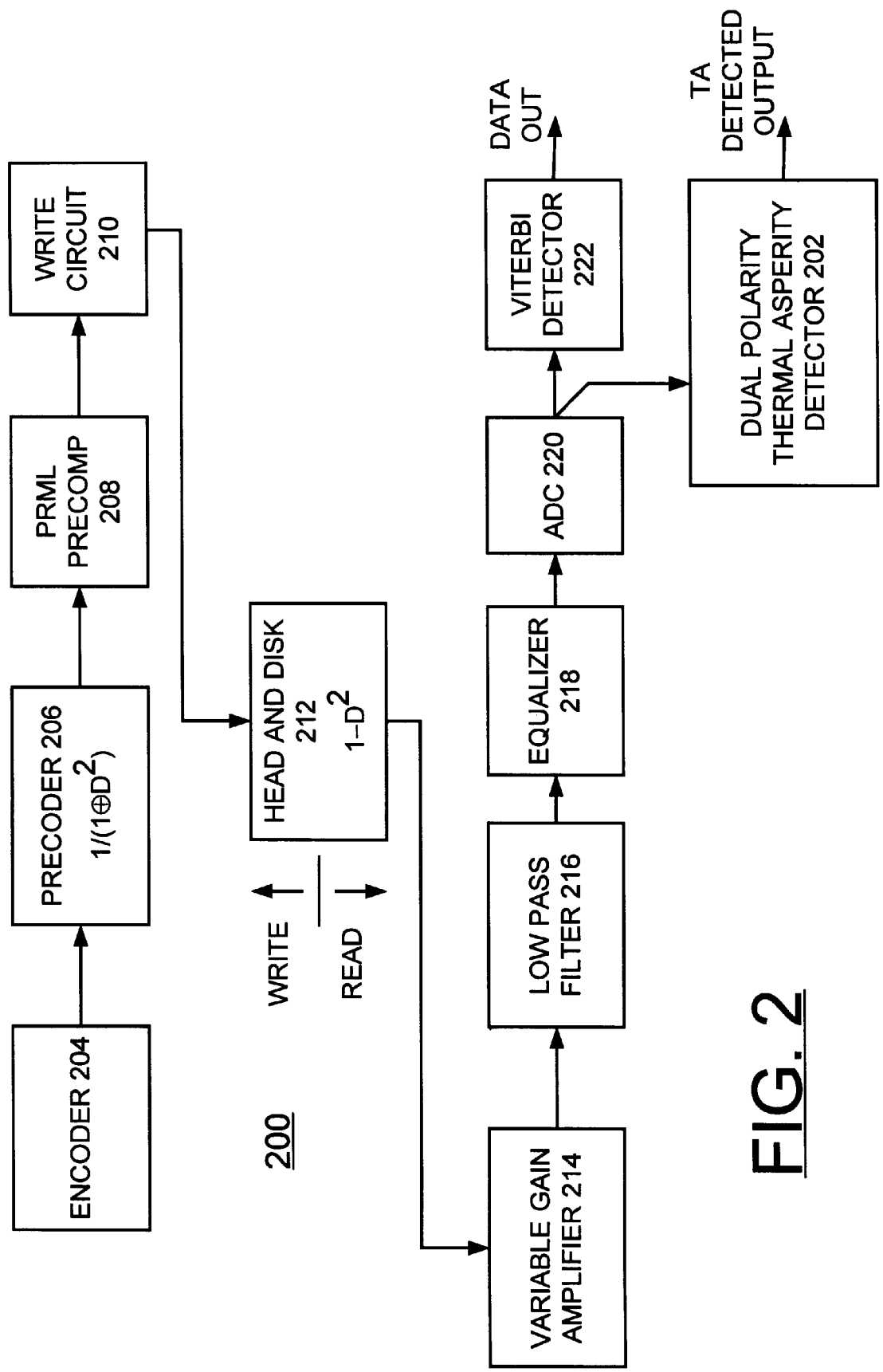
FIG. 2 is a block diagram of a data channel of the direct access storage device (DASD) of FIG. 1 embodying the present invention.

Referring now to FIG. 2, there is shown a block diagram of a partial-response maximum-likelihood (PRML) channel 200 available in the DASD 100 including an improved dual polarity thermal asperity detector 202 of the invention. In accordance with features of the invention, the dual polarity thermal asperity detector 202 provides dynamic polarity detection and is immune to the signal shaping effects of discrete time equalization. Data to be written is applied to an encoder 204 for providing a modulation coded output having predefined run length constraints. A precoder 206 follows the encoder 204 described by a $1/(1 \oplus D^2)$ operation where D is a unit delay operator and the symbol $\oplus$ is used to represent modulo-2 addition. Modulo-2 addition can be thought of as an exclusive or operation. A PRML precomp 208 coupled to the precoder 206 provides a modulated binary pulse signal applied to a write circuit 210 that provides the modulated write current for writing to the disk surface. An analog read signal is obtained at head and disk block 212 described by the $(1-D^2)$ operation. The read signal is applied to a variable gain amplifier (VGA) 214 and the amplified read signal is applied to a lowpass filter 216 and an equalizer 218. The filtered read signal is converted to digital form by an analog-to-digital converter (ADC) 220 that provides, for example, 64 possible 6-bit sampled values. The samples of the ADC 220 are applied to a Viterbi detector 222 and also applied to the thermal asperity detector 202 of the invention.

Figure 3:
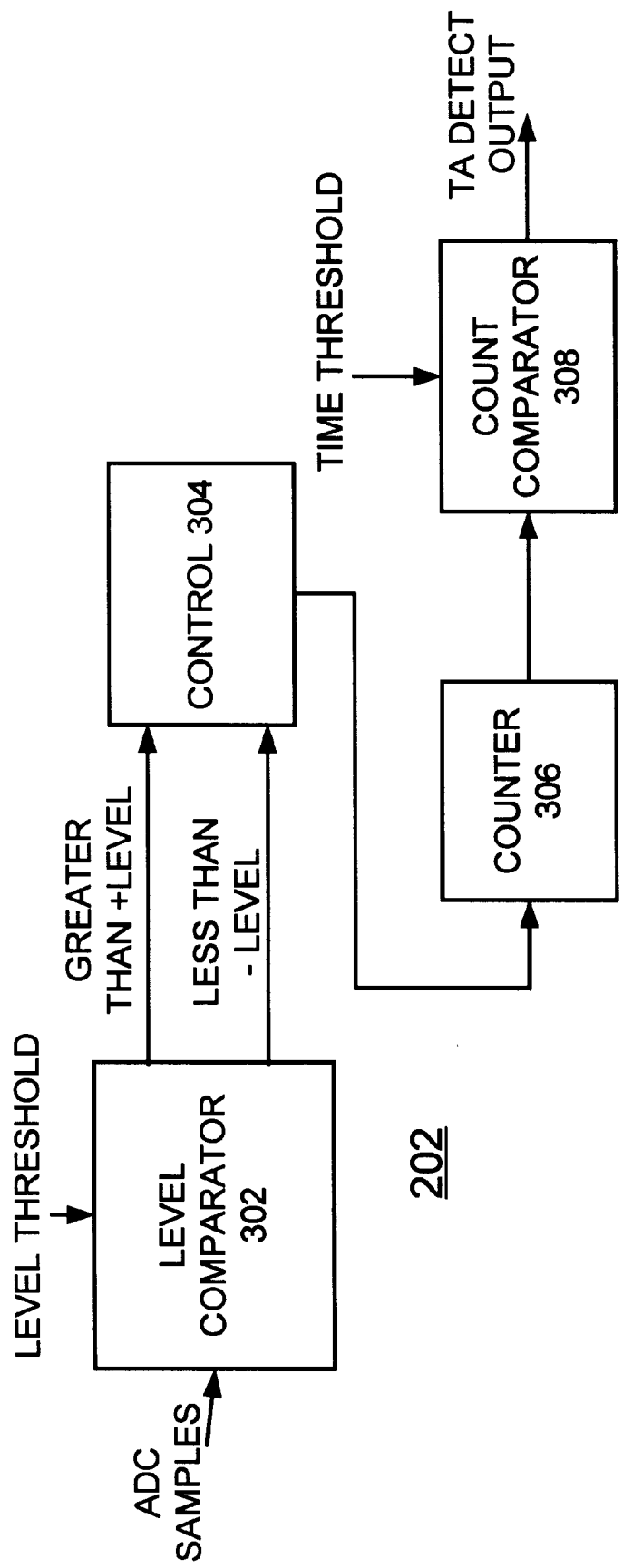
FIG. 3 is a schematic and block diagram representation of a dual polarity thermal asperity detector of FIG. 2 in accordance with the present invention.

Referring now to FIG. 3, thermal asperity detector 202 includes a level comparator 302 receiving the ADC sample values. The level comparator 302 indicates that a sample is greater than a set positive level threshold or that a sample is less than a set negative level threshold as indicated at lines labeled GREATER THAN +LEVEL and LESS THAN −LEVEL. Dual polarity thermal asperity detector 202 of the invention identifies a TA event by counting the number of consecutive samples exceeding either the positive or negative programmable level threshold setting. A control block 304 uses the level comparator output to increment or clear a counter value of a counter 306. The counter 306 is incremented by the control block 304 with each consecutive sample exceeding either the positive or negative programmable level. A count comparator 308 is connected to the counter 306. A predetermined time threshold value is provided to the count comparator 308 that is used for comparing the count value.

Figure 4:
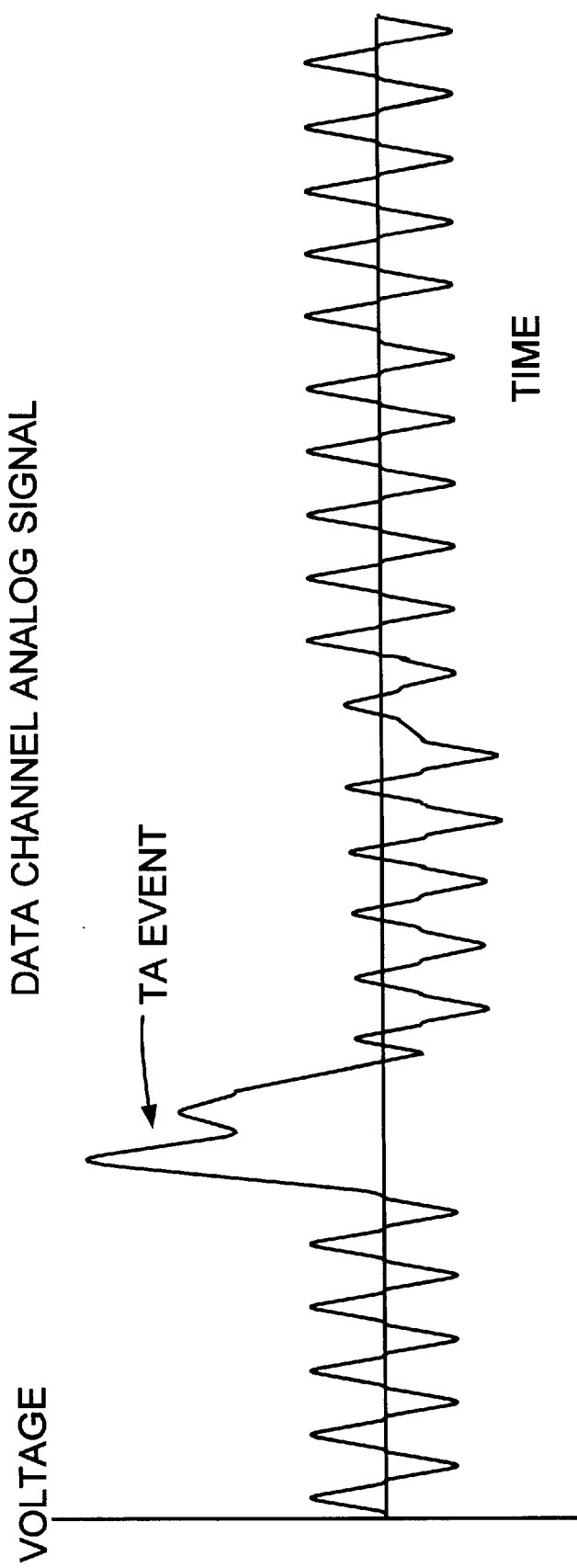
FIGS. 4, 5A, and 5B are charts illustrating an example of the operation of the dual polarity thermal asperity detector of FIG. 3 in accordance with the present invention.
Figure 5A:
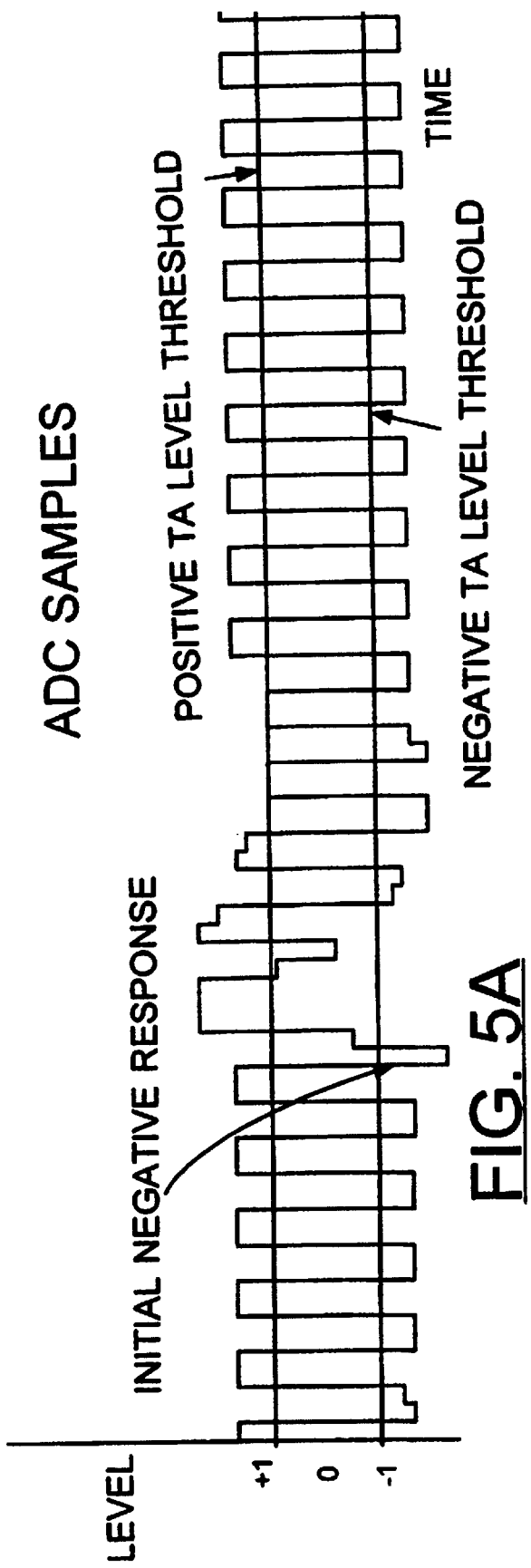
Figure 5B:
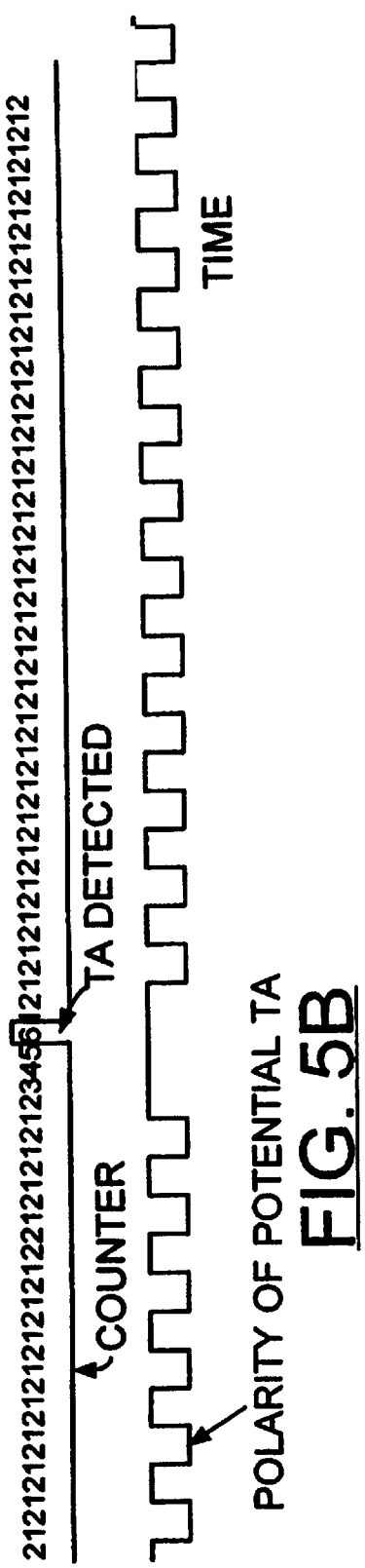

Referring to FIGS. 4, 5A, and 5B, operation of the dual polarity thermal asperity detector 202 is illustrated. In FIG. 4, an analog input signal is illustrated with respect to the vertical axis with time indicated along the horizontal axis. One thermal asperity event is illustrated in FIG. 4. In FIG. 5A, ADC samples are illustrated with respect to the vertical axis with time indicated along the horizontal axis. A negative TA level threshold and a positive TA level threshold are illustrated in FIG. 5A. An example of the operation of the counter 306, the polarity of a potential TA provided by the control 304, and the dual polarity thermal asperity detector 202 is provided in FIG. 5B. In FIG. 5B, the counter values of the counter 306 and the polarity values of the dual polarity thermal asperity detector 202 are shown for the illustrated ADC samples of FIG. 5A. Note that the counter values of the counter 306 indicate a TA event responsive to the illustrated TA event in the analog signal of FIG. 4 and the ADC samples of FIG. 5A. Note that the polarity of the detected TA is positive in the illustrated dynamic polarity of potential TA. As shown in FIG. 5B, the counter 308 is reset to 1 or 2 with each sequential sample alternately exceeding the positive level threshold and then exceeding the negative level threshold. Note that during the detected TA, consecutive samples exceeding the positive programmable level threshold setting are counted and the TA is detected when the count value reaches a predetermined count threshold of 6, as shown in FIG. 5B.

While the present invention has been described with reference to the details of the embodiments of the invention shown in the drawing, these details are not intended to limit the scope of the invention as claimed in the appended claims.

What is claimed is:

1. A method for thermal asperity detection in a direct access storage device comprising the steps of:

receiving a data signal from a data channel in the direct access storage device;

utilizing a level threshold comparator, comparing data samples of said data signal with a positive level threshold and a negative level threshold;

responsive to each identified consecutive data sample above said positive level threshold and responsive to each identified consecutive data sample less than said negative level threshold, incrementing a counter value;

clearing said counter value responsive to an identified data sample exceeding said negative level threshold following an identified data sample exceeding said positive level threshold;

comparing said counter value with a predefined count threshold; and identifying a thermal asperity event responsive to said counter value above said predefined count threshold.

2. The method for thermal asperity detection in a direct access storage device as recited in claim 1 includes the step of dynamically maintaining a polarity value for a potential thermal asperity event.

3. The method for thermal asperity detection in a direct access storage device as recited in claim 1 wherein said step of comparing said counter value with said predefined count threshold includes the step of providing a predetermined time threshold value to a count comparator being used for comparing said count value with said predefined count threshold.

4. The method for thermal asperity detection in a direct access storage device as recited in claim 1 includes the step of clearing said counter value responsive to an identified data sample exceeding said positive level threshold following an identified data sample exceeding said negative level threshold.

5. The method for thermal asperity detection in a direct access storage device as recited in claim 1 includes the step of providing said positive level threshold at a selected level.

6. The method for thermal asperity detection in a direct access storage device as recited in claim 1 includes the step of providing said negative level threshold at a selected level.

7. Apparatus for thermal asperity detection in a direct access storage device comprising:

a level threshold comparator receiving sequential data samples from a data channel in the direct access storage device and comparing said sequential data samples with both a positive level threshold and a negative level threshold;

a counter coupled to a counter control;

said counter control, responsive to each identified consecutive data sample above said positive level threshold and responsive to each identified consecutive data sample less than said negative level threshold, for incrementing a counter value of said counter;

a count comparator for comparing said counter value with a predefined count threshold and for identifying a thermal asperity event responsive to said counter value above said predefined count threshold; and said counter control for clearing said counter value responsive to an identified data sample exceeding said negative level threshold following an identified data sample exceeding said positive level threshold.

8. Apparatus for thermal asperity detection in a direct access storage device as recited in claim 7 wherein said count comparator receives a predetermined time threshold value used for comparing said count values.

9. Apparatus for thermal asperity detection in a direct access storage device as recited in claim 7 wherein said counter control dynamically maintains a polarity value for a potential thermal asperity event.

10. Apparatus for thermal asperity detection in a direct access storage device as recited in claim 7 wherein said negative level threshold is a predetermined value at a selected level.

11. Apparatus for thermal asperity detection in a direct access storage device as recited in claim 7 wherein said counter control clears said counter value responsive to an identified data sample exceeding said positive level threshold following an identified data sample exceeding said negative level threshold.

12. Apparatus for thermal asperity detection in a direct access storage device as recited in claim 7 wherein said positive level threshold is a predetermined value at a selected level.

13. A direct access storage device (DASD) including a data channel comprising:

an analog-to-digital converter for receiving an analog data signal and providing sequential sample values;

a level threshold comparator receiving said sequential data samples and comparing said sequential data samples with both a positive level threshold and a negative level threshold;

a counter coupled to a counter control;

said counter control, responsive to each identified consecutive data sample above said positive level threshold and responsive to each identified consecutive data sample less than said negative level threshold, for incrementing a counter value;

said counter control for clearing said counter value responsive to an identified data sample exceeding said negative level threshold following an identified data sample exceeding said positive level threshold; and a count comparator for comparing said counter value with a predefined count threshold and for identifying a thermal asperity event responsive to said counter value above said predefined count threshold.

14. The direct access storage device (DASD) as recited in claim 13 wherein said counter control dynamically maintains a polarity value for a potential thermal asperity event.

15. The direct access storage device (DASD) as recited in claim 13 wherein said positive level threshold is a predetermined value above a zero data sample level.

16. The direct access storage device (DASD) as recited in claim 13 wherein said negative level threshold is a predetermined value below a zero data sample level.

17. The direct access storage device (DASD) as recited in claim 13 wherein said count comparator receives a predetermined time threshold value used for comparing said count values.

* * * * *